United States Patent [19]

Richmond

[11] Patent Number: 4,904,936
[45] Date of Patent: Feb. 27, 1990

[54] AUTOMOTIVE WHEEL SPEED SENSOR INCLUDING FERROMAGNETIC FLUX CARRYING CUP CLOSING AN OPENING IN THE WHEEL BEARING HOUSING

[75] Inventor: James W. Richmond, Carmel, Ind.

[73] Assignee: Emhart Industries, Inc., Indianapolis, Ind.

[21] Appl. No.: 171,162

[22] Filed: Mar. 21, 1988

Related U.S. Application Data

[63] Continuation of Ser. No. 835,514, Mar. 3, 1986, abandoned.

[51] Int. Cl.$^4$ .......................... G01P 3/488; B60T 8/32; H02K 21/26
[52] U.S. Cl. ..................................... 324/174; 73/519; 188/181 R; 310/168
[58] Field of Search ............... 324/163, 164, 166, 167, 324/173, 174, 208; 73/518, 519; 340/870.31, 870.32, 870.33; 310/168, 171; 188/181 R, 181 A

[56] References Cited

U.S. PATENT DOCUMENTS

| 3,949,252 | 4/1976 | Riesenberg et al. | 310/168 |
| 3,960,248 | 6/1976 | Tribe | 310/168 X |
| 4,045,738 | 8/1977 | Buzzell | 324/174 |
| 4,392,375 | 7/1983 | Eguchi et al. | 324/208 X |
| 4,529,933 | 7/1985 | Bleeke | 324/173 |
| 4,689,557 | 8/1987 | Smith et al. | 324/174 |

FOREIGN PATENT DOCUMENTS

| 1268399 | 5/1968 | Fed. Rep. of Germany | 324/174 |
| 3133061 | 4/1982 | Fed. Rep. of Germany | 324/208 |
| 2252573 | 7/1975 | France | 324/174 |
| 0141509 | 9/1982 | Japan | 324/208 |
| 0208667 | 12/1983 | Japan | 324/173 |
| 835020 | 5/1960 | United Kingdom | 324/174 |
| 1071122 | 6/1967 | United Kingdom | 324/208 |

OTHER PUBLICATIONS

Madison et al, "Vacuum-Electronic Device Provides . . . Antilocking During Sudden Brake Applications", SAE Journal, vol. 77, No. 11, Nov. 1969, pp. 63–68.
Wehmer, B. F.; Electromagnetic Tachometer, IBM Technical Disclosure Bulletin, vol. 11, No. 7, Dec. 1968, pp. 746, 747.
Biggs et al; Hall-Effect Impulse Emitter, IBM Technical Disclosure Bulletin, vol. 23, No. 1, Jun. 1980, pp. 418, 419.
"Magnetic Sensors for Speed and Motion", *Machine Design*, Apr. 12, 1979, p. 68.

Primary Examiner—Gerard R. Strecker
Attorney, Agent, or Firm—Carl A. Forest

[57] ABSTRACT

There is described a speed sensor that is particularly adapted to moving vehicles such as automobiles. A permanent magnet, stator assembly, and field coil are held within a cup that is adapted to mate a bearing assembly of a non-driven wheel of the vehicle. A magnetic flux is provided by the permanent magnet and when rotor poles carried by the bearing assembly rotate in close proximity to the stator assembly, the magnetic flux in turn generates an alternating voltage current in the field coil. The alternating current so generated is then fed through an electrical terminal to a vehicle computer.

20 Claims, 2 Drawing Sheets

AUTOMOTIVE WHEEL SPEED SENSOR INCLUDING FERROMAGNETIC FLUX CARRYING CUP CLOSING AN OPENING IN THE WHEEL BEARING HOUSING

This application is a continuation of application Ser. No. 835,514, filed 3/3/86, now abandoned.

BACKGROUND OF THE INVENTION

The present invention relates to a speed sensor and more particularly to a speed sensor that is particularly useful in braking systems of vehicles such as automobiles.

Magnetic type induction speed sensors have been used to measure the speed of rotating members for some years. However, when used in automobiles, for example, the systems were attached externally to the wheel bearing assembly and were exposed to the environment. This is especially hazardous when it is considered that the vehicle travels over all types of roadways.

The present invention represents an improvement over such prior art systems in that the speed sensor functions within a grease cup of the automobiles wheel bearing assembly.

SUMMARY OF THE INVENTION

Accordingly there is provided a speed sensor that is particularly adaptable to vehicle braking systems which in general comprises a cup, an open end of which is adapted to mate a wheel bearing assembly of a vehicle; a permanent magnet, a stator assembly, and a field coil all carried in said cup; and electrical terminals electrically coupled to said field coil and extending outside said cup.

DETAILED DESCRIPTION OF THE INVENTION

Figure 1:
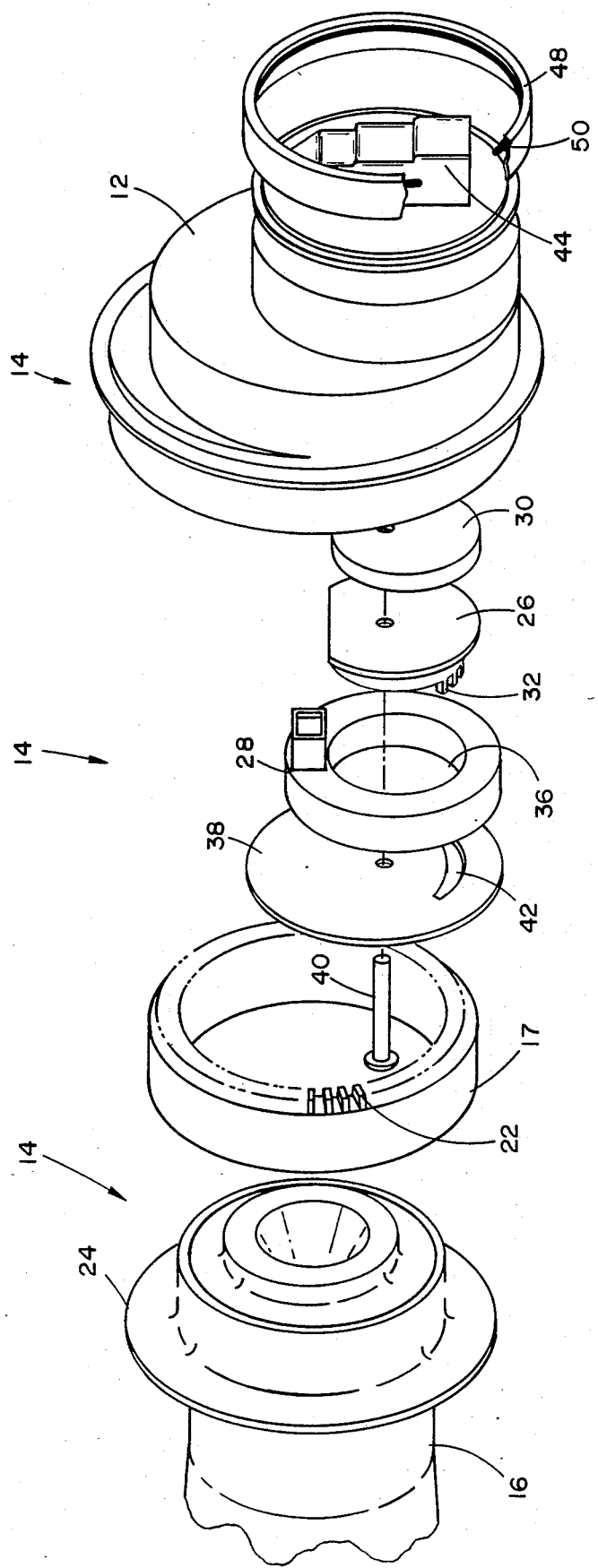
FIG. 1 is an exploded view of a speed sensor assembly employing the features of the invention.
Figure 2:
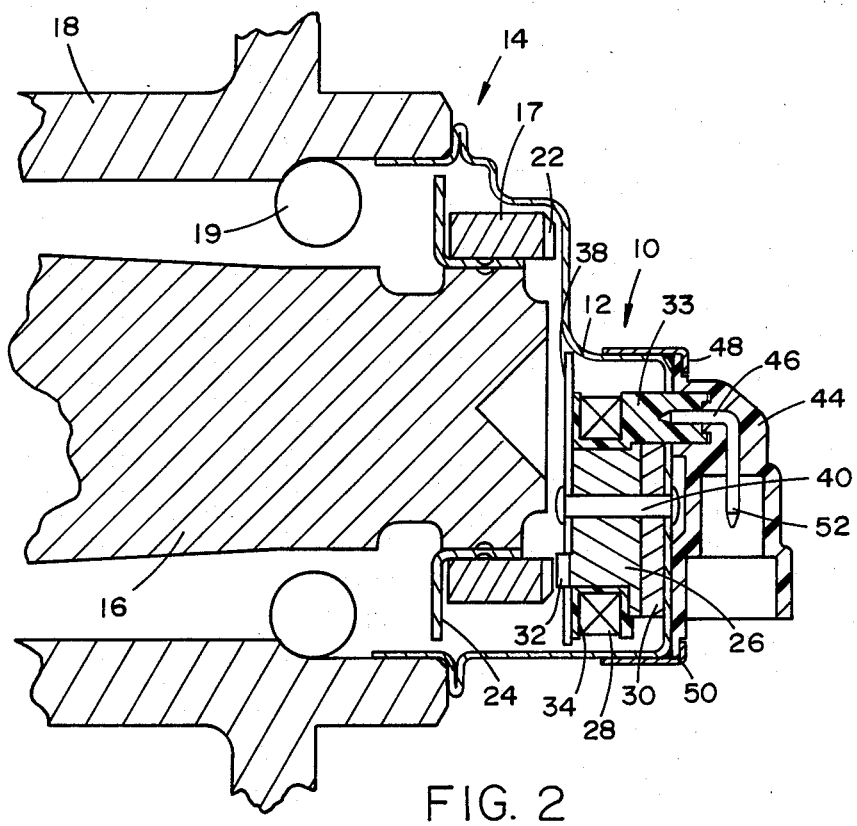
FIG. 2 is a partial section of the speed sensor of FIG. 1.

Referring now to FIGS. 1 and 2, there is shown a speed sensor assembly 10 that is contained within a grease cup 12 of a wheel bearing assembly 14 of an automobile. In general, wheel bearing assembly 14 includes a spindle 16 that rotates within housing 18 through bearings 19. An automobile wheel (not shown) is carried on spindle 16 to be rotated with the spindle. Normally, the speed sensor assembly will be located on a spindle assembly of a wheel that is not driven by the automobile engine. Grease cup 12 is fabricated of steel in order to provide good flux through the cup.

A plurality of rotor poles 22 extend from a rotor ring 17 which is press fitted onto spindle 16 through flange 24 which is also press fitted onto the spindle. The rotor ring as well as the poles are fabricated of steel or sintered iron in order to provide a good magnetic flux path.

Speed sensor assembly 10 includes a stator pole piece 26, a field coil 28, and a permanent magnet 30. Stator pole piece 26 is fabricated from steel or sintered iron and includes a plurality of poles 32 of the same polarity that extend over an arc of a portion of a circle and through a slot 42 of plate 38 to be in working relation to rotor poles 22. Permanent magnet 30 is fabricated of a barium ferrite or similar magnet material. Field coil 28 is carried on a coil bobbin 33 in an annular space 34. The bobbin has a central aperture 36 in which the stator pole piece 26 is substantially carried. Here, "substantially carried" means the structure as shown in 2 in which the major portion of stator pole piece 26 is contained within the aperture 36. The whole assembly is held together through plate 38 and rivet 40.

An electrical connector 44 is attached to grease cup 12 and carries two electrical terminals 46 which engage bobbin 33. As shown, the terminals are bent over at a right angle to create a compact assembly. The terminal is held in place by ring 48 which is connected to cup 12 in sealing relation through O-ring 50.

In operation, a magnetic flux path is created around the grease cup 12 and the rotor ring 17 and through stator 26 by the permanent magnet 30 when the rotor and stator poles are aligned. When rotor poles 22 are rotated simultaneously with the rotation of spindle 16, the magnetic flux in the gap between the rotor poles 22 and stator poles 32 changes in intensity as the rotor moves from tooth to tooth of the stator poles. That is, upon misalignment of the rotor and stator poles, the flux sweeps through field coil 28 to a position around an edge of permanent magnet 30 causing a change in flux at the gap. This changing intensity in combination with the flux sweep causes an alternating voltage to be generated in field coil 28 which is then fed to a computer through electrical terminals 46. The use of a few stator poles as opposed to a single pole or poles extending around a complete circle provides the strongest magnetic pulsations and optimum generation of AC voltage in coil 28.

In addition, both the stator poles and rotor poles are tapered toward their tips such that the tip is less in thickness than the space between individual teeth. This also increases the concentration to the magnetic flux generated at the poles.

Figure 3:
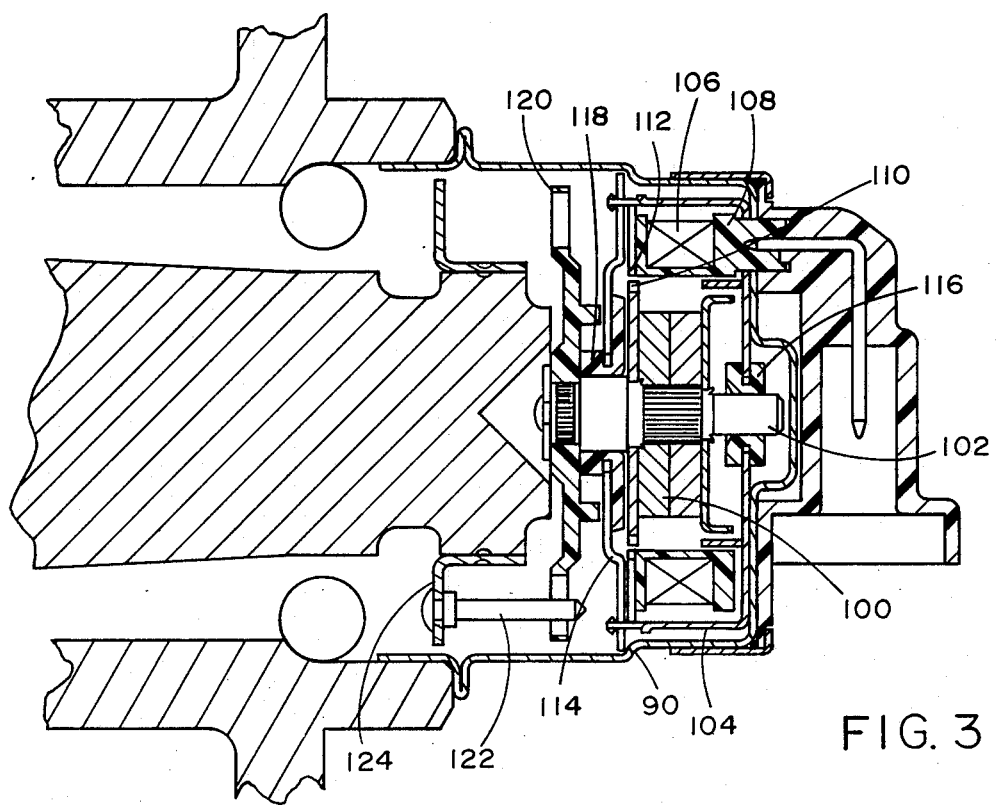
FIG. 3 is a partial section of another embodiment of a speed sensor assembly.

Another embodiment of the invention is shown in FIG. 3. In this embodiment, the rotor poles are made part of the speed sensor assembly that is contained within grease cup 90. Thus as shown, speed sensor assembly includes a stator cup 104 having an open end, a permanent magnet 100 carried on a rotatable hub 102, field coil 106 carried in bobbin 108, and rotor poles 110. Stator poles 112 are attached to a stator cup 104. They interact magnetically with rotor poles 110. A cover plate 114 closes the open end of the stator cup. Hub 102 rotates in bushings 116 and 118.

Hub 102 is mechanically coupled to spindle 16 through a bar or plate 120 that is fixed to the hub and a pin 122 that is carried by the spindle through flange 124. Rotation of spindle 16 causes engagement of pin 122 with bar 120 to rotate hub 102 and thus permanent magnet 100 and rotor poles 110. Rotation of the rotor poles causes an alternating current to be induced in field coil 106 in the same manner as that with respect to the embodiment of FIGS. 1 and 2.

What is claimed is:

1. A speed sensor assembly for providing an electrical signal representative of the speed of the wheel of a vehicle, said speed sensor assembly being of the type utilizable in combination with a vehicle wheel assembly including a wheel bearing spindle rotatable on a bearing within a wheel bearing housing, said housing having an opening therein providing access to said bearing, said wheel assembly also including a cup for closing said opening, said speed sensor comprising:
- a rotor pole mechanically coupled to said vehicle wheel bearing spindle;
- a stator pole mechanically coupled to said wheel bearing housing by said cup;
- magnetic means for generating magnetic flux through said rotor pole and said stator pole;
- said magnetic means including ferromagnetic means for providing a flux path from said stator pole to said rotor pole, said ferromagnetic means comprising said cup; and
- means for interacting with said magnetic flux to generate said electrical signal in response to changes in said flux caused by said rotor moving with respect to said stator when said wheel moves with respect to said wheel bearing housing.

2. A speed sensor assembly as in claim 1 wherein said means for interacting includes electrical terminal means for transmitting said signal through said cup.

3. A speed sensor assembly according to claim 2 wherein said electrical terminal means includes a connector formed at a right angle to an axis of said cup.

4. A speed sensor according to claim 3 wherein said stator means includes a field coil and said electrical terminal means includes means for electrically engaging said field coil.

5. A speed sensor according to claim 3 further including a ring holding said connector to said cup.

6. A speed sensor according to claim 5 further including an O-ring sealing said ring to said cup.

7. A speed sensor assembly as in claim 1 wherein said ferromagnetic means includes a flange attached to said wheel bearing spindle and providing a flux path from said rotor pole to said cup.

8. A speed sensor assembly as in claim 1 wherein said magnetic means includes a permanent magnet and said means for interacting includes a field coil and a stator pole piece which pole piece comprises said stator pole and a ferromagnetic member connecting said magnet and said stator pole.

9. A speed sensor assembly as in claim 8 wherein said coil is annular and said ferromagnetic means passes near the periphery of said coil in completing said flux path to said rotor pole.

10. A speed sensor assembly according to claim 8 wherein said field coil includes a central aperture and wherein said stator pole piece is substantially carried within said central aperture.

11. A speed sensor assembly according to claim 10 wherein said ferromagnetic means comprises a cup enclosing said rotor and stator poles, said field coil and said pole piece, said cup having a bottom and said permanent magnet is carried between said stator pole piece and said bottom of said cup.

12. A speed sensor assembly as in claim 1 wherein said stator pole is one of a few stator poles extending over an arc of a portion of a circle 13. A speed sensor assembly as in claim 12 wherein said rotor pole is one of a plurality of poles extending over the circumference of a circle.

14. A speed sensor assembly according to claim 13 wherein said stator poles are all of the same polarity.

15. A speed sensor assembly according to claim 13 wherein said stator poles and rotor poles are tapered toward their tips.

16. In a speed sensor assembly for providing an electrical signal representative of the speed of a vehicle wheel, said speed sensor assembly being of the type utilizable in combination with a vehicle wheel bearing assembly having a bearing enclosed in a wheel bearing housing, the housing having an opening providing access to said bearing which opening is closed by a cup, said speed sensor assembly further being of the type comprising electromagnetic means for providing said electrical signal which means includes magnetic means for generating a magnetic flux and a ferromagnetic means for carrying said magnetic flux, the improvement wherein said ferromagnetic means comprises said wheel bearing cup.

17. In a speed sensor assembly as in claim 16, the further improvement wherein said speed sensor assembly includes at least one electrical terminal electrically coupled to said electromagnetic means and extending through said wheel bearing cup.

18. The combination of a vehicle wheel speed sensor with a vehicle wheel assembly said combination comprising:
- a wheel bearing and a wheel bearing housing supporting said wheel bearing, said housing having an opening therein providing access to said bearing;
- a wheel bearing spindle rotatable in said wheel bearing housing;
- a rotor pole fixed to said spindle;
- a stator pole;
- magnetic means for generating magnetic flux through said rotor pole and said stator pole;
- said magnetic means including ferromagnetic means for providing a flux path from said stator pole to said rotor pole said ferromagnetic means comprising a cup and said cup closing said opening and supporting said stator pole; and
- means for interacting with said magnetic flux to generate said electrical signal in response to changes in said flux caused by said rotor pole moving with respect to said stator pole when said spindle rotates in said housing.

19. The combination of claim 18 wherein said magnetic means includes a permanent magnet and said means for interacting includes a field coil having an aperture and a stator pole piece which comprises said stator pole and a ferromagnetic member connecting said magnet and said stator pole, and wherein said stator pole piece is substantially carried within said aperture.

20. The combination of claim 18 wherein said means for interacting further comprises electrical terminal means for transmitting said signal through said cup.

* * * * *